United States Patent [19]
Winowiski et al.

[11] Patent Number: 5,281,434
[45] Date of Patent: Jan. 25, 1994

[54] COMPOSITION AND PROCESS OF MAKING AN ANIMAL FEED BINDER COMPOSED OF OZONATED LIGNOSULFONATE

[75] Inventors: Thomas S. Winowiski, Mosinee; John W. Hollis, Jr., Schofield, both of Wis.

[73] Assignee: LignoTech USA, Rothschild, Wis.

[21] Appl. No.: 888,519

[22] Filed: May 26, 1992

[51] Int. Cl.$^5$ ................................................. A23K 1/00
[52] U.S. Cl. .................................... 426/635; 426/454; 426/535; 426/623; 426/807; 530/501
[58] Field of Search .............. 426/635, 623, 454, 535, 426/807; 530/531

[56] References Cited

U.S. PATENT DOCUMENTS

| | | | |
|---|---|---|---|
| 4,088,640 | 5/1978 | Detroit | 530/531 |
| 4,181,652 | 1/1980 | Detroit | 530/531 |
| 4,871,825 | 10/1989 | Lin | 527/400 |
| 4,952,415 | 8/1990 | Winowski | 426/285 |

FOREIGN PATENT DOCUMENTS 1203414 4/1986 Canada.

OTHER PUBLICATIONS

Hawley, "The Condensed Chemical Dictionary", Van Nostrand Reinhold Co., New York, 1962, Tenth Edition, p. 769.

*Primary Examiner*—Helen F. Pratt
*Attorney, Agent, or Firm*—Andrus, Sceales, Starke & Sawall

[57] ABSTRACT

A low inclusion animal feed binder composed of ozonated lignosulfonate. The ozonated lignosulfonate is a reaction product of lignosulfonate and ozone prepared by treating lignosulfonate with 2–20% ozone by weight of lignosulfonate solids at an initial pH of 2 to 12 and at a temperature of 5° to 100° C. The binder is incorporated with the animal feed in an amount from 0.01 to 2% by weight of dry feed.

16 Claims, No Drawings

COMPOSITION AND PROCESS OF MAKING AN ANIMAL FEED BINDER COMPOSED OF OZONATED LIGNOSULFONATE

BACKGROUND OF THE INVENTION

This invention concerns an animal feed binder. More particularly, it is related to an improved binder composed of ozonated lignosulfonate.

As used herein, the term "lignosulfonate" refers to the reaction product of lignin which is inherently obtained during the sulfite pulping of wood, straw, corn stalks, bagasse and the like, and is a principal constituent of spent sulfite liquor which is derived from that process. The term also encompasses sulfonated lignin that is obtained by sulfonating lignin from pulping liquors of the kraft, soda and other well-known alkali pulping operations.

Animal feeds are generally produced with low cost by-product ingredients. These ingredients are often dusty, unpalatable, of low density, and have inadequate nutrient profile. To correct these shortcomings, ingredients are combined into a mixture with the necessary vitamins, minerals, and amino acids to provide adequate energy and protein, and to meet the nutrient requirements of the animals. This is normally accomplished by extrusion and/or compaction techniques to form pellets, blocks or briquettes. Extrusion and compaction eliminate ingredient segregation, increase bulk density, reduce dust, mask unpalatable ingredients, and reduce wastage. All of these benefits are dependent on the pellet, block or briquette maintaining its physical integrity.

Since feed formulations are typically dictated by the cost and availability of by-product ingredients, it is not always possible to produce durable pellets. Some ingredients such as animal fat, meat meal, ground corn, and oat hulls, have poor binding qualities and may even be antagonistic to binding. When such ingredients are used a binder, such as lignosulfonate, is often included to insure that a durable pellet is produced. Typically, lignosulfonate, a naturally occurring polymer generated in sulfite pulping of wood, is applied to the feed at a dosage of 25 to 50 lbs. per ton (or 1.25–2.5%) of feed. This level of application reduces fines from 25 to 60% in comparison with pellets containing no binder.

Lignosulfonates contain no protein and little metabolizable energy and are therefore unpopular in nutritionally dense formulations, e.g., poultry feeds and pig starter feeds, due to the diluting effect they have on the feed. In addition, lignosulfonates are thought to be unpalatable to piglets and young pigs, limiting their use in pig starter feeds. Manufactures of poultry and pig starter feeds would therefore benefit from a binder which performs as well as a standard lignosulfonate but applied at a lower inclusion rate, namely, at 5–10 pounds per ton of feed. Such a binder would reduce the diluting effect of the binder, and correspondingly increase the available nutrition to be supplied to the animal.

Several "low inclusion" binders have been introduced to the feed industry. These include Nutraflex, a protein colloid manufactured by Swift Company, Hercule's Cellulose Gum, a carboxymethyl cellulose, Production Aid ES, a lignosulfonate-starch blend produced by Cravac Industries, and Basfin, a ureaformaldehyde resin marketed by BASF. Each of these products provides some improvement in pellet quality, but none can produce fines reduction equal to that which occurs when lignosulfonate binders are used at their recommended dosages.

In addition to the above noted "low inclusion" binders, there are attempts in the prior art to improve the binding property of lignosulfonate as an animal feed binder. Thus, Canadian Patent No. 1,203,414 (Apr. 23, 1986) reveals a feed composition comprising a feedstuff and a lignosulfonate-based pelleting aid, characterized in that the pelleting aid comprises a dried, substantially water soluble, sulfonated lignin containing material, which has been modified by crosslinking such as with formaldehyde to increase its molecular weight and thus its solution viscosity. In U.S. Pat. No. 4,871,825 (Oct. 3, 1989), there is disclosed a binder composed of a graft copolymer of high molecular weight sulfonated lignin material and an acrylic compound, said binder exhibiting at least twice as good binding power as a commercial "low inclusion" binder, Production Aid ES. Recently, in U.S. Pat. No. 4,952,415 (Aug. 28, 1990) there is revealed an animal feed composition and method of compounding animal feed utilizing as a binder a copolymer of a sulfonated lignin material and a monomer such as acrylic acid, maleic acid, and methacrylic acid. These and other prior art binders, although showing improved binding property, have not proven to have as great effectiveness as is desirable. The introduction of foreign matters to lignosulfonate in making the copolymer binder raises a concern about its suitability to be used in the animal feed. It thus becomes desirable to have a "low inclusion" binder that is totally based on lignosulfonate, and contains no added chemical entities. It is also beneficial to have an effective binder that can be produced by a simple and low cost method.

A major object of this invention is to provide an effective animal feed binder.

Another object of this invention is to provide a binder from lignosulfonate.

An additional object of this invention is to provide a simple process for the production of the animal feed binder.

A further object of this invention is to provide a feed binder that is produced without addition of foreign chemicals to lignosulfonate.

Other objectives, features and advantages of this invention will be evident from the following detailed description.

SUMMARY OF THE INVENTION

It has now been found that certain of the foregoing and related objects of the present invention are readily obtained in an animal feed binder, that is a reaction product of lignosulfonate and ozone; said product being prepared by treating lignosulfonate with 2 to 20%, preferably 5–10%, ozone by weight of lignosulfonate solids at an initial pH of 2 to 12, preferably 5 to 10, and at a temperature of 5° C. to 100° C., preferably 20° C. to 50° C.

In one form, the binder is in a liquid form at 40 to 60% solids. In another form, it is a powder obtained by any conventional drying method such as spray drying. The binder is incorporated with the animal feed in an amount from 0.01 to 2%, preferably from 0.05 to 0.5% on the basis of said feed dry weight, by use of any typical pelleting method.

DETAILED DESCRIPTION OF THE INVENTION

It is well known that pelletibility properties vary considerably with different feeds, feed compositions and pelleting conditions. However, despite advances in pelleting techniques, only few feed rations can achieve good pellet quality without the use of a pelleting aid, or feed binder.

Because of the wide variation in pelletibility as a result of test conditions, it becomes necessary to evaluate and compare any new feed binders with prior art product according to a standardized procedure. For the purpose of this invention, the evaluation method employed herein is detailed as follows:

Feed

Feed is purchased as a 3:1 mix of corn and 44% solvent extract soybean meal. It is hammermilled, mixed, and bagged by the supplier; examples of particle size distributions are listed below. Desired moisture content is 12-14%. Feed is purchased in 4000 lb. lots, sufficient for 400 test batches.

| Particle Distribution of Basal Feed | | | |
|---|---|---|---|
| U.S. Sieve | Lot A | Lot B | Lot C |
| 12 | 2.1 | 3.2 | 1.2 |
| 16 | 11.0 | 9.3 | 3.5 |
| 30 | 33.3 | 26.0 | 23.3 |
| 50 | 24.2 | 24.5 | 29.0 |
| Pan | 29.4 | 37.0 | 43.0 |

Batch Preparation

Three bags of feed (300 lbs. total) are combined and split into 32 batches of 4 kg each. Five grams of dicalcium phosphate are added to each batch to maintain clean die holes.

All tests include positive and negative control treatments, namely 1.25% AmeriBond 2000, a lignosulfonate binder available from LignoTech USA, Inc., and no binder. These are combined with the test binders in randomized blocks. Each block is replicated from three to five times in a given experiment. Binders are applied by weight percent on the basal feed mix. All batches are mixed before pelleting is initiated. Typical time interval between mixing and pelleting is 2 hours.

Pelleting

A CPM CL-Type 2 Laboratory Pellet Mill, fitted with a 5/32"×¾" die and a steam conditioning chamber, is used for pelleting. The mill is prewarmed to 180° F. by running basal feed for approximately 15 minutes prior to testing.

Batches are added to the supply hopper of the mill in sequence, without interruption or change in settings. A 4 kg batch requires about 150 seconds to process. Approximately 30 seconds are required for feed to transit the conditioner and mill. The initial 45 seconds of each run is discarded and the remainder of the batch is retained for testing. These hot pellets are returned to room temperature by evaporative cooling under a stream of forced air and are then stored at room temperature in closed containers.

A recording thermometer is used to monitor the temperature of the conditioned meal. A recording ammeter monitors the motor load on the pellet mill. Each batch is timed with a stopwatch to insure uniform process rate.

Holmen Tester—100 g of pellets are cycled for 30 seconds. Pellet durability is the percentage of pellets that are retained on a 3 mm sieve. Each sample is tested in duplicate.

A desired pellet durability for the control (no binder) is 80-85% pellets remaining. The durability for a standard binder should be 85-90%.

Reporting

Because durability of the basal ration may vary, binder efficiency is reported relative to the quality of the basal ration. This is done by calculating the percent reduction of fines (% ROF) versus those in the control. For example, if the test binder and control have durabilities of 90 and 84 respectively, the binder would have reduced fines by 6/16 units, or 37.5% Expressed in equation, $$\% \ ROF = [(F_t - F_c)/F_c] \times 100$$

where
% ROF = % reduction of fines,
$F_t$ = % fines for test binder
$F_c$ = % fines for control pellet (no binder)

According to especially specific embodiments of this invention, an effective animal feed binder is produced by ozonation of lignosulfonates, said lignosulfonates may be in the form of sodium, potassium calcium or ammonium salts, and said lignosulfonates are softwood-, hardwood-, or blends of hardwood and softwood lignosulfonates. The lignosulfonates may contain up to 25% by weight of sugars, oligosaccharides and other non-lignin organics.

In accordance with a preferred embodiment of the invention, spent sulfite liquors that have been subjected to fermentation or ultrafiltration may be employed. These processes enrich the lignosulfonate content by eliminating a portion or all of carbohydrates, inorganic salts and other extraneous materials.

Any suitable ozonation process can be used to produce the ozonated lignosulfonate binder of this invention. One of the processes is disclosed in U.S. Pat. No. 4,181,652 (Jan. 1, 1980). Specifically, as employed in this invention as an animal feed binder, an ozonated lignosulfonate is produced by treating lignosulfonate with 2 to 20%, preferably 5-10%, ozone by weight of lignosulfonate solids, at an initial pH of 2-12, preferably 5 to 10, and at a temperature of 5° C. to 100° C., preferably 20° C. to 50° C.

In a method of compounding feed for animals in accordance with this invention, the ozonated lignosulfonate employed as a binder is incorporated with animal feed in an amount from 0.01 to 2%, preferably 0.05 to 0.5% on weight of feed solids. The binder is preferably utilized in powder form to facilitate the even distribution among feed ingredients during pelleting. However, the liquid form of said binder can also be employed.

The mechanism by which ozonated lignosulfonate functions as a superior binder over the prior art animal feed binders is not well understood. That common oxidation processes (e.g., with peroxide, oxygen etc.) and condensation methods (e.g., with formaldehyde) as practiced in the prior art, do not yield as good a binder as ozonation strongly indicates the uniqueness of ozonated lignosulfonate in feed binding. This uniqueness seems to have little to do with an increase in carboxylic groups.

The following examples will serve to demonstrate the advantages, and the practice of the invention. These examples are merely intended for illustration without in any way limiting the scope of the invention.

EXAMPLE 1

A lignosulfonate, namely Norlig L available from LignoTech USA, Inc., was used in a liquid form of about 50% solids. The liquor containing 250 grams of solids was placed in a 4-neck round-bottom flask. Water (133 grams) was added to take the solution to 40% solids. Two drops of T-MULZ DSS-75 defoamer available from Harcos Chemical, Inc. of Kansas City, Mo. were added. The flask was placed in a water bath such that temperature could be maintained at 50° C. throughout the reaction period. A mechanical stir shaft was placed into the central neck of the flask. A gas sparge tube was placed into the second neck such that ozone could be added as finely divided bubbles beneath the surface of the solution. The third neck carries outlet gas to a trap where it is bubbled through a 2% potassium iodide solution. The fourth neck is fitted with a thermometer to monitor the temperature of the solution.

A Welsbach Laboratory Ozonator was used to generate 0.14 grams of ozone per minute. It was desired to apply 25 grams of ozone on the lignosulfonate (or 10% $O_3$ on lignosulfonate solids). The initial pH of the lignosulfonate liquor was 5.5, and ending pH (after ozonation) was 3.1. There was no noticeable increase in viscosity; both initial and final viscosity of the liquor were about 50 cps.

The data in Table 1 clearly show that ozonation enhances significantly the binding and fines-reducing properties of lignosulfonate.

TABLE 1

| Binder | Dosage % | lbs/ton | % Fines | % ROF |
|---|---|---|---|---|
| Control (No binder) | 0 | | 21.6 | 0 |
| Norlig L | 0.25 | 5 | 16.4 | 24 |
| Example 1 | 0.25 | 5 | 14.7 | 32 |
| Standard binder (AmeriBond) | 1.25 | 25 | 13.1 | 39 |

Note:
Dosage on dry weight of feed.

EXAMPLE 2

This example demonstrates the uniqueness of ozonated lignosulfonate as a binder in comparison with lignosulfonate oxidized with other oxidants such as hydrogen peroxide. Thus, Norlig L as in Example 1 was oxidized with 3.5% $H_2O_2$ according to Example IV of Canadian Patent No. 1,203,414. The pH, solids concentration and viscosity are 10.5, 41% and 6,100 cps, respectively. The sample was evaluated according to the test method detailed in the present specification (the same method employed in Example 1). Table 2 shows the superior performance of ozonated lignosulfonate over the hydrogen peroxide oxidized counterpart.

TABLE 2

| Binder | Dosage % | lbs/ton | % Fines | % ROF |
|---|---|---|---|---|
| Control (No binder) | 0 | | 24.0 | 0 |
| Invention (Example 1) | 0.25 | 5 | 15.3 | 36.0 |

TABLE 2-continued

| Binder | Dosage % | lbs/ton | % Fines | % ROF |
|---|---|---|---|---|
| Prior Art (Example 2) | 0.25 | 5 | 17.9 | 25.5 |

EXAMPLE 3

This example compares the performance of ozonated lignosulfonate and the prior art condensed lignosulfonate. Thus, Norlig L as in Example 1 was condensed with 2.5% formaldehyde at 90° C. for 27 hours according to Example VII of Canadian Patent No. 1,203,414. The final pH, solids concentration and viscosity of the product were 4.5, 46% and 115 cps, respectively. Table 3 presents the test data of the prior art condensed product and the invention ozonated lignosulfonate. Ozonated product clearly outperforms the $CH_2O$ condensed counterpart.

TABLE 3

| Binder | Dosage % | lbs/ton | % Fines | % ROF |
|---|---|---|---|---|
| Control (No binder) | 0 | | 24.0 | 0 |
| Invention (Example 1) | 0.25 | 5 | 17.3 | 27.7 |
| Prior Art (Example 3) | 0.25 | 5 | 19.1 | 20.3 |

Various modes of carrying out the invention are contemplated as being within the scope of the following claims particularly pointing out and distinctly claiming the subject matter regarded as the invention.

We claim:

1. A method of compounding feed for animals, comprising the steps of
   providing an animal feed comprising a protein-containing organic meal,
   incorporating with said animal feed an effective amount of a binder to form a feed mixture, said feed binder is an ozonated lignosulfonate, wherein said ozonated lignosulfonate is lignosulfonate that has been treated with 2 to 20% ozone by weight of lignosulfonate solids, at an initial pH of 2 to 12 and at a temperature of 5° C. to 100° C.;
   and forming said mixture into a desired pellet form.

2. The method of claim 1 wherein said binder is incorporated in an amount of 0.01 to 2% on weight of feed.

3. The method of claim 1 wherein said ozonated lignosulfonate is prepared by ozonolysis of lignosulfonate-containing spent sulfite liquor.

4. The method of claim 3 wherein said spent sulfite liquor is purified by fermentation or ultrafiltration.

5. The method of claim 1 wherein said ozonated lignosulfonate is prepared by ozonolysis of a lignosulfonate in the form of a sodium, potassium, calcium or ammonium salt.

6. The method of claim 1 wherein said binder is in a powder form.

7. The method of claim 1 wherein said ozonated lignosulfonate is prepared by ozonolysis of a sulfonated lignin.

8. The method of claim 1 wherein said ozonated lignosulfonate is lignosulfonate that has been treated with 5-10% ozone by weight of lignosulfonate solids, at an initial pH of 5 to 10, and at a temperature of 20° C. to 50° C.

9. The method of claim 1 wherein said binder is incorporated in an amount of 0.05 to 0.5% on weight of feed.

10. An animal feed composition, comprising a protein-containing organic meal, and an ozonated lignosulfonate binder produced by ozonolysis of lignosulfonate with 2-20% ozone by weight of said lignosulfonate.

11. The composition of claim 10 wherein about 0.01 to 2% on dry weight basis of said binder is incorporated with said animal feed.

12. The composition of claim 10 wherein said lignosulfonate is obtained by fermentation or ultrafiltration of spent sulfite liquor.

13. The composition of claim 10 wherein said ozonated lignosulfonate is prepared by ozonolysis of a spent sulfite liquor.

14. The composition of claim 10 wherein said ozonated lignosulfonate is prepared by ozonolysis of a sulfonated lignin.

15. The composition of claim 10 wherein said binder is an ozonated lignosulfonate produced by ozonation of lignosulfonate with 5-10% ozone by weight of said lignosulfonate.

16. The composition of claim 10 wherein 0.05 to 0.5% on dry weight basis of said binder is incorporated with said animal feed.

* * * * *